(12) United States Patent
Busha et al.

(10) Patent No.: US 12,105,845 B2
(45) Date of Patent: Oct. 1, 2024

(54) SYSTEM AND METHOD FOR ENTITY RESOLUTION OF A DATA ELEMENT

(71) Applicant: SECURITI, Inc., Coyote, CA (US)

(72) Inventors: Michael Busha, Menlo Park, CA (US); Jiachen Mao, San Jose, CA (US); Michael Rinehart, Pleasanton, CA (US); Rehan Jalil, Portola Valley, CA (US)

(73) Assignee: SECURITI, Inc., Coyote, CA (US)

( * ) Notice: Subject to any disclaimer, the term of this patent is extended or adjusted under 35 U.S.C. 154(b) by 788 days.

(21) Appl. No.: 17/090,943

(22) Filed: Nov. 6, 2020

(65) Prior Publication Data

US 2022/0043934 A1 Feb. 10, 2022

Related U.S. Application Data

(60) Provisional application No. 63/062,809, filed on Aug. 7, 2020.

(51) Int. Cl.
| | | |
|---|---|---|
| *G06F 21/62* | (2013.01) | |
| *G06F 16/75* | (2019.01) | |
| *G06F 17/18* | (2006.01) | |
| *G06F 18/15* | (2023.01) | |
| *G06F 18/21* | (2023.01) | |

(Continued)

(52) U.S. Cl.
CPC ......... *G06F 21/6254* (2013.01); *G06F 16/75* (2019.01); *G06F 17/18* (2013.01); *G06F 18/21* (2023.01); *G06F 21/602* (2013.01); *G06Q 50/01* (2013.01); *G06Q 50/16* (2013.01); *G06F 18/15* (2023.01)

(58) Field of Classification Search
CPC ...... G06F 16/27; G06F 16/273; G06F 16/275; G06F 16/285; G06F 18/231; G06F 18/23; G06F 18/22; G06F 18/20; G06F 18/00; G06F 18/15; G06F 18/10; G06N 5/047; G06N 5/046; G06N 5/04; G06N 5/022; G06N 5/02

See application file for complete search history.

(56) References Cited

U.S. PATENT DOCUMENTS 8,554,719 B2  10/2013  McGrew et al.
9,535,902 B1 *  1/2017  Michalak ............ G06F 16/3331
(Continued)

*Primary Examiner* — Tae K Kim
(74) *Attorney, Agent, or Firm* — Jason C. Cameron

(57) ABSTRACT

A system and a method for entity resolution is disclosed. An entity reference parsing subsystem to parse one or more entity references of a corresponding seed set of entity into corresponding one or more personal data properties and property values. A property value standardization subsystem performs one or more standardization operations for standardization of the corresponding one or more property values. A property value anonymization subsystem secures the one or more property values by performing one or more anonymization procedures. A property strength quantification subsystem identifies at least one additional property suspected to belong to the seed set of the entity, assigns a property strength score to the at least one additional property, adds the at least one additional property to the corresponding seed set of entity. A local entity resolution and a global entity resolution subsystem performs a first and a second entity resolution process respectively.

16 Claims, 5 Drawing Sheets

(51) Int. Cl.
　　　*G06F 21/60*　　　(2013.01)
　　　*G06Q 50/00*　　　(2024.01)
　　　*G06Q 50/16*　　　(2024.01)

(56) References Cited

U.S. PATENT DOCUMENTS

| | | | |
|---|---|---|---|
| 9,922,290 B2* | 3/2018 | Thomas | G06N 20/00 |
| 10,180,969 B2* | 1/2019 | Trudel | G06F 16/23 |
| 2009/0089332 A1 | 4/2009 | Harger et al. | |
| 2011/0307435 A1* | 12/2011 | Overell | G06F 16/367 |
| | | | 706/46 |
| 2016/0034542 A1* | 2/2016 | Lamego | G06F 16/2379 |
| | | | 707/723 |
| 2016/0048770 A1* | 2/2016 | Thomas | G06Q 10/10 |
| | | | 707/706 |
| 2016/0092557 A1* | 3/2016 | Stojanovic | G06F 16/248 |
| | | | 707/723 |
| 2016/0323411 A1* | 11/2016 | Lee | G06Q 50/01 |
| 2017/0017760 A1* | 1/2017 | Freese | G16H 40/63 |
| 2018/0082183 A1* | 3/2018 | Hertz | G06Q 10/10 |
| 2018/0276280 A1* | 9/2018 | Trudel | G06F 16/2456 |
| 2021/0334295 A1* | 10/2021 | Zhu | G06F 16/273 |

* cited by examiner

SYSTEM AND METHOD FOR ENTITY RESOLUTION OF A DATA ELEMENT

This Application claims priority from a Provisional patent application filed in the United States of America having Patent Application No. 63/062,809, filed on Aug. 7, 2020, and titled "SECURE STORAGE OF AND ASSOCIATION OF DATA ELEMENTS TO AN ENTITY ACROSS DATA SOURCE".

BACKGROUND

Embodiments of the present disclosure relate to a data association system and more particularly to a system and a method for entity resolution of a data element.

Entities represent a wide variety of different types of things with independent and distinct existence within a business system. The entities may be objects or places, persons with callable functions, or they may be even more rich structures. The entities are resolved to detect entity relationships by using an entity resolution process. The entity resolution (ER) disambiguates records that corresponds to real world entities across and within datasets. One or more applications of entity resolution are tremendous, particularly for public sector and federal datasets related to health, transportation, finance, law enforcement, and anti-terrorism. Unfortunately, problems associated with the entity resolution are also equally challenging as volume and velocity of data grows, inference across networks and finding semantic relationships between entities becomes increasingly difficult. As a result, various entity resolution systems are available which focusses on solving the associative process in one or more given scenarios.

Conventionally, the entity resolution systems which are available focusses on solving and accomplishment of entity resolution by using one or more textual analysis approaches. Such textual analysis approaches include utilizing textual comparisons such as edit distance between the pair of words, numerical differences on a set of attribute values that generally have similar sets of attribute properties. However, such a conventional system requires relatively homogeneous sets of entity references to handle any new attributes. Also, the conventional system assumes a general homogeneity of attributes between the entities and the entity references and most of the entity references for the entities of the same category includes same attribute types. Moreover, such a conventional system assumes that the entity references are relatively clean and a vast majority of the attributes in the entity references upon parsing points to a particular entity. Furthermore, such a conventional system is prone to leaking of sensitive information of attribute values of an entity which leads to event of data breach.

Hence, there is a need for an improved system and a method for entity resolution of a data element in order to address the aforementioned issues.

BRIEF DESCRIPTION

In accordance with an embodiment of the present disclosure a system for entity resolution of a data element is disclosed. The system includes an entity reference parsing subsystem configured to parse one or more entity references of a corresponding seed set of entity of the data element into corresponding one or more personal data properties and one or more property values. The system also includes a property value standardization subsystem operatively coupled to the entity reference subsystem. The property value standardization subsystem is configured to determine one or more standardization operations corresponding to a type of data of the one or more property values based on the one or more entity references parsed. The property value standardization subsystem is also configured to perform the one or more standardization operations determined for standardization of the corresponding one or more property values. The system also includes a property value anonymization subsystem operatively coupled to the property value standardization subsystem. The property value anonymization subsystem is configured to secure the one or more property values by performing one or more anonymization procedures based on the one or more standardization operations performed. The system also includes a property strength quantification subsystem operatively coupled to the property value anonymization subsystem. The property strength quantification subsystem is configured to identify at least one additional property suspected to belong to the seed set of the entity based on an observation of the one or more entity references upon anonymization of the one or more property values. The property strength quantification subsystem is also configured to assign a property strength score to the at least one additional property identified by utilizing one or more property strength quantification models based on observation of the one or more property values for the one or more entity references. The property strength quantification subsystem is also configured to add the at least one additional property to the corresponding seed set of entity based on the property strength score assigned to the at least one additional property. The system also includes a local entity resolution subsystem operatively coupled to the property standardization subsystem. The local entity resolution subsystem is configured to perform a first entity resolution process based on comparison of an entity reference among the one or more entity references with each of an entity respectively from the corresponding seed set of the entity at a predetermined time interval. The system also includes a global entity resolution subsystem operatively coupled to the local entity resolution subsystem. The global entity resolution subsystem is configured to perform a second entity resolution process based on comparison of the one or more property values for the one or more entity references with one or more property values for the one or more entities. The system also includes an entity creation and updating subsystem operatively coupled to the global entity resolution subsystem. The entity creation and updating subsystem is configured to modify the corresponding seed set of entity or the one or more entity references for entity resolution based on the property strength score assigned to the at least one additional property in the one or more entity references.

In accordance with an embodiment of the present disclosure, a method for entity resolution of a data element is disclosed. The method includes parsing, by an entity reference parsing subsystem, one or more entity references of a corresponding seed set of entity of the data element into corresponding one or more personal data properties and one or more property values. The method also includes determining, by a property value standardization subsystem, one or more standardization operations corresponding to a type of data of the one or more property values based on the one or more entity references parsed. The method also includes performing, by the property value standardization subsystem, the one or more standardization operations determined for standardization of the corresponding one or more property values. The method also includes securing, by a property value anonymization subsystem, the one or more property values by performing one or more anonymization procedures based on the one or more standardization operations performed. The method also includes identifying, by a property strength quantification subsystem, at least one additional property suspected to belong to the seed set of the entity based on an observation of the one or more entity references upon anonymization of the one or more property values. The method also includes assigning, by the property strength quantification subsystem, a property strength score to the at least one additional property identified by utilizing one or more property strength quantification models based on observation of the one or more property values for the one or more entity references. The method also includes adding, by the property strength quantification subsystem, the at least one additional property to the corresponding seed set of entity based on the property strength score assigned to the at least one additional property. The method also includes performing, by a local entity resolution subsystem, a first entity resolution process based on comparison of an entity reference among the one or more entity references with each of an entity respectively from the corresponding seed set of the entity at a predetermined time interval. The method also includes performing, by a global resolution subsystem, a second entity resolution process based on comparison of the one or more property values for the one or more entity references with one or more property values for the one or more entities. The method also includes modifying, by an entity creation and updating subsystem, the corresponding seed set of entity or the one or more entity references for entity resolution based on the property strength score assigned to the at least one additional property in the one or more entity references.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
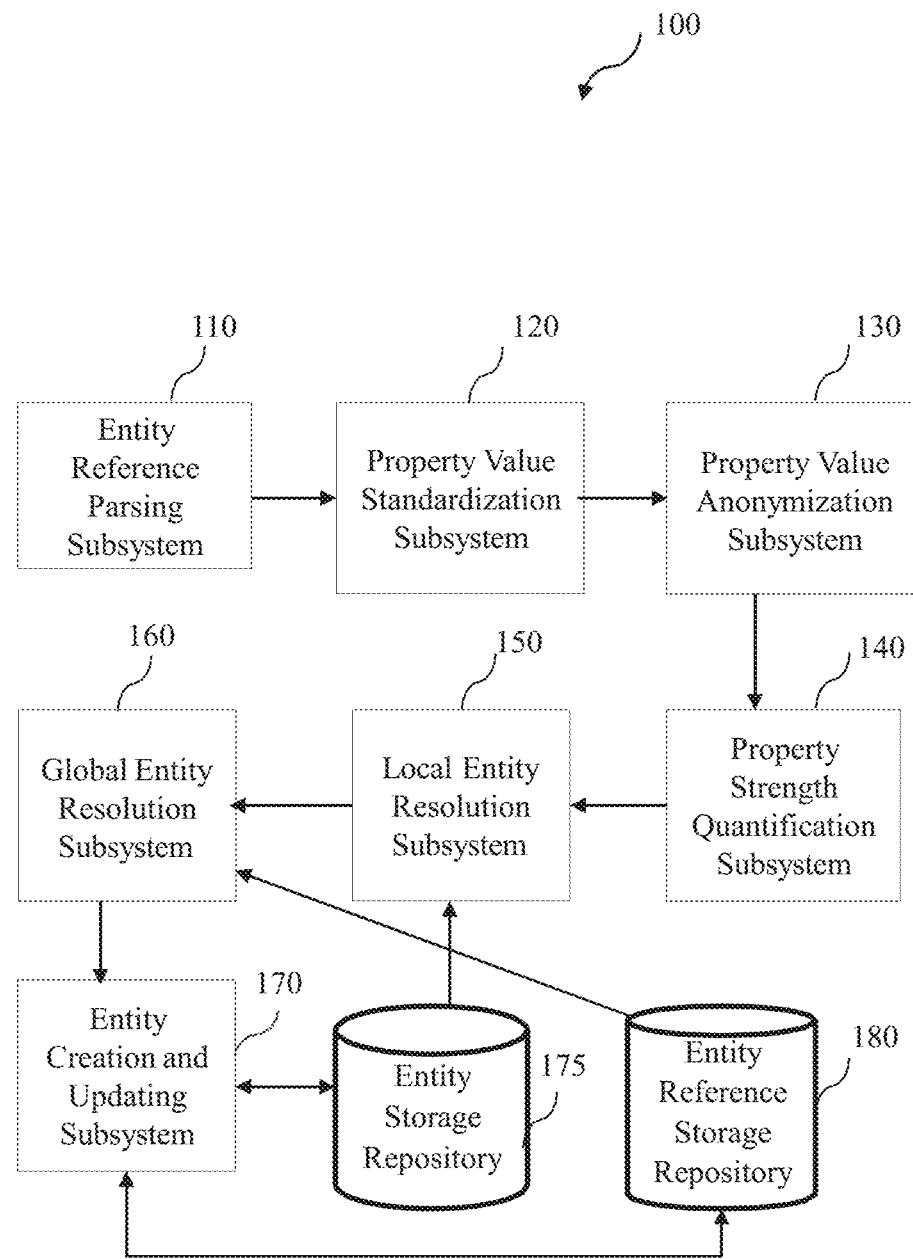
FIG. 1 is a block diagram of a system for entity resolution of a data element in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for entity resolution of a data element. The system includes an entity reference parsing subsystem configured to parse one or more entity references of a corresponding seed set of entity of the data element into corresponding one or more personal data properties and one or more property values. The system also includes a property value standardization subsystem operatively coupled to the entity reference subsystem. The property value standardization subsystem is configured to determine one or more standardization operations corresponding to a type of data of the one or more property values based on the one or more entity references parsed. The property value standardization subsystem is also configured to perform the one or more standardization operations determined for standardization of the corresponding one or more property values. The system also includes a property value anonymization subsystem operatively coupled to the property value standardization subsystem. The property value anonymization subsystem is configured to secure the one or more property values by performing one or more anonymization procedures based on the one or more standardization operations performed. The system also includes a property strength quantification subsystem operatively coupled to the property value anonymization subsystem. The property strength quantification subsystem is configured to identify at least one additional property suspected to belong to the seed set of the entity based on an observation of the one or more entity references upon anonymization of the one or more property values. The property strength quantification subsystem is also configured to assign a property strength score to the at least one additional property identified by utilizing one or more property strength quantification models based on observation of the one or more property values for the one or more entity references. The property strength quantification subsystem is also configured to add the at least one additional property to the corresponding seed set of entity based on the property strength score assigned to the at least one additional property. The system also includes a local entity resolution subsystem operatively coupled to the property standardization subsystem. The local entity resolution subsystem is configured to perform a first entity resolution process based on comparison of an entity reference among the one or more entity references with each of an entity respectively from the corresponding seed set of the entity at a predetermined time interval. The system also includes a global entity resolution subsystem operatively coupled to the local entity resolution subsystem. The global entity resolution subsystem is configured to perform a second entity resolution process based on comparison of the one or more property values for the one or more entity references with one or more property values for the one or more entities. The system also includes an entity creation and updating subsystem operatively coupled to the global entity resolution subsystem. The entity creation and updating subsystem is configured to modify the corresponding seed set of entity or the one or more entity references for entity resolution based on the property strength score assigned to the at least one additional property in the one or more entity references.

FIG. 1 is a block diagram of a system 100 for entity resolution of a data element in accordance with an embodiment of the present disclosure. The system 100 includes an entity reference parsing subsystem 110 configured to parse one or more entity references of a corresponding seed set of entity of the data element into corresponding one or more personal data properties and one or more property values. In one embodiment, the seed set of entity may include at least one of a size zero entity, a pre-populated set of one or more entities, a subset of one or more properties for an entity or a combination thereof. As used herein, the term size zero entity' is defined as an entity with no or zero details of property and values. Similarly, the term 'pre-populated set of one or more entities' is defined as the entities which are populated with data including properties, wherein the data is extracted from an external source. As used herein, the term 'entity' is defined as a specific object or a thing with an independent existence. In one embodiment, the entity may include one or more properties with one or more corresponding property values. In such embodiment, the entity may include, but not limited to an individual, an organization, an object and the like. Similarly, the term 'entity reference' used herein is defined as a reference or a source referring to a specific entity. In one embodiment, the one or more entity references may include at least one of a text source, a database, an audio source, an image source or a combination thereof.

The system 100 also includes a property value standardization subsystem 120 operatively coupled to the entity reference parsing subsystem 110. The property value standardization subsystem 120 is configured to determine one or more standardization operations corresponding to a type of data of the one or more property values based on the one or more entity references parsed. In some embodiment, the type of data of the one or more property values may include, a numeric data, a character data, and the like. The property value standardization subsystem 120 is also configured to perform the one or more standardization operations determined for standardization of the corresponding one or more property values. In one embodiment, the one or more standardization operations may include at least one of a letter or number or date formatting operation, local sensitive hashing operation, phonetic standardization operation, bucket standardization operation or a combination thereof. In such embodiment, the letter or number or data formatting operation comprises a standard character operation performed on a string for standardization of the corresponding one or more property values. In another embodiment, the local sensitive hashing operation is performed for identification of sensitivity and similarity between one or more similar input words of the one or more property values by using a hash function and a similarity calculation technique. For example, a word or a string 'Robert' is divided into substrings of fixed length as depicted in equation (1) as follows:

$$S \text{ (robert)} = \{ro, ob, be, er, rt\} \quad (1)$$

Again, minimum hash values on each of the substrings is calculated and stored as shown below in equation (2):

$$\text{MinHash (robert)} = \{\text{Min } (md5 \ (s+S \text{ (robert)}))\} \quad (2)$$

Where, the set is overall of salt values 's'.

In one embodiment, the hash function may include, but not limited to a message digest (MD5) hash function, secure hash algorithm (SHA-2) hash function and the like. Again, after calculation of the minimum hash values, a similarity between the one or more similar input words such as 'Robert' and 'Roberta' are calculated using the similarity calculation technique which is represented below in equation (3) as follows:

$$\text{Sim (Robert, Roberta)} = J \text{ (MinHash(robert), MinHash (roberta))} \quad (3)$$

where, $J(C_i, C_j) = |C_i \cap C_j / C_i \cup C_j|$. Tuning the length of the substrings and the number of salts used enables to have more or less sensitivity to the similarity of words. In some embodiment, the similarity calculation technique may include a Jaccard similarity calculation technique. Finally, the word 'Robert' is standardized into one or more hash values.

In yet another embodiment, the phonetic standardization operation is performed to determine one or more input words of the one or more property values having a resemblance in sound using one or more phonetic determination techniques. In such embodiment, the one or more phonetic determination technique may include, but not limited to, a Soundex technique, a Metaphone technique and the like. For example, comparison of the one or more similar input words are depicted below in equation (4) as follows:

$$\text{SOUNDEX (robert)} = \text{SOUNDEX (robirt)} \quad (4)$$

which, indicates that sound of both the words are similar.

In one embodiment, the bucket standardization operation includes creating one or more categorical buckets of a predefined size based on identification of a minimum range and a maximum range of the one or more property values. The bucket standardization technique also includes placing the one or more property values for standardization into the one or more categorical buckets created.

The system 100 also includes a property value anonymization subsystem 130 operatively coupled to the property value standardization subsystem 120. The property value anonymization subsystem 130 is configured to secure the one or more property values by performing one or more anonymization procedures based on the one or more standardization operations performed. In one embodiment, the one or more anonymization procedures may include at least one of an encryption technique or a hashing technique for securing the one or more property values. Encryption is a reversible process where a string like "robert" is taken and encoded into "f3045958b36n4e2a5e3abe9444f0dfeaed42653b930efbfe2 8935e6f5def7e1". This encoding is accomplished using a private key that uniquely determines the output value. The private key is also utilized to decode the string back to the original value. Similarly, the hashing technique is a one-way process which depends on a key, but the key is not used to decode the data.

The system 100 also includes a property strength quantification subsystem 140 operatively coupled to the property value anonymization subsystem 130. The property strength quantification subsystem 140 is configured to identify at least one additional property suspected to belong to the seed set of the entity based on an observation of the one or more entity references upon anonymization of the one or more property values. In one embodiment, the one or more property strength quantification models includes one or more statistical models implemented using a maximum likelihood estimation technique and a probabilistic enhancement technique for assignment of the property strength score. In such embodiment, the maximum likelihood estimation technique includes addition of at least one additional property to an entity based on estimation of a most likely property value upon calculation of probability of a corresponding property value. In another embodiment, the probabilistic enhancement technique may include addition of at least one additional property to an entity based on calculation of probability of a corresponding property value by using a siumoid function.

The property strength quantification subsystem 140 is also configured to assign a property strength score to the at least one additional property identified by utilizing one or more property strength quantification models based on observation of the one or more property values for the one or more entity references. The property strength quantification subsystem 140 identifies one or more new properties that should belong to an entity based on observed entity references. The property strength quantification subsystem 140 is also configured to add the at least one additional property to the corresponding seed set of entity based on the property strength score assigned to the at least one additional property. In one embodiment, the one or more property strength quantification models may include one or more statistical models implemented using a maximum likelihood estimation technique and a probabilistic enhancement technique for assignment of the property strength score. The maximum likelihood estimation technique is a binary classification process to identify at least one new or additional property to add to the entity. The maximum likelihood estimation technique includes addition of the at least one additional property to the entity based on estimation of a most likely property value upon calculation of probability of a corresponding property value. For example, the one or more entity references ($ER_E$,p) that resolve to a given entity (E) with a property p is represented below in equation (5) and equation (6) respectively.

$$E=(E_i \rightarrow E) \tag{5}$$

$$ER_{E,p}=\{ER_1, ER_2, \ldots, ER_n\} \tag{6}$$

The probability calculated for addition of the at least one property p with value v based on the distribution of observed property values for all entity references in $ER_{E,p}$, is represented as $P_p$ (v|$ER_{E,p}$). Finally, based on identification of the most likely value upon probability calculation, that is, by identifying $v_i$ such that $P_p$ ($v_i$|$ER_{E,p}$=Max($P_p$(v|$ER_{E,p}$))) where v is the set of all different observed values for property p in the set of entity references $ER_{E,p}$, the at least one property p is added to the entity. Similarly, the probabilistic enhancement technique comprises addition of the at least one additional property to the entity based on calculation of the probability of a corresponding property value by using a sigmoid function.

The system 100 also includes a local entity resolution subsystem 150 operatively coupled to the properly strength quantification subsystem 140. The local entity resolution subsystem 150 is configured to perform a first entity resolution process based on comparison of an entity reference among the one or more entity references with each of an entity respectively from the corresponding seed set of the entity at a predetermined time interval. In one embodiment, the first entity resolution process includes at least one of a pre-defined heuristic example between the entity and the entity reference, an evidence accumulation, between the entity and the entity reference using a one-degree comparison function or a n-degree comparison function, a standardized and anonymized comparison function, a property strength integration or a combination thereof. In such embodiment, the first entity resolution process may include a local resolving process for entity resolution. The pre-defined heuristic example helps in entity resolution by considering both the entity and the entity reference. Again, the evidence accumulation calculates the probability such as P (E|ER) considering that the entity reference (ER) belongs to the entity (E). The probability is convolution of the one-degree comparison function or the n-degree comparison function of individual properties. For the one-degree comparison, $$P(E|ER)=F(\{f_p(E_p|ER_p)\}), \tag{7}$$

where, $f_p$ is a property-specific function for determining how likely the entity reference is to resolve to a specific Entity considering just that property in isolation. Again, F is a function that combines a set of individual comparison probabilities. In one embodiment, the function may include a Pearson method or a Fisher method for combining P-values of the Bayes approach to combining probabilities. Similarly, the n-degree comparison expands the above $f_p$ calculation to allow for higher order comparisons. The n-degree comparison function expanded to:

$$f_p(E|ER)=f_p(E_p|ER_p, ER_{pi}) \tag{8},$$

where higher order statistics is taken into account for calculation of the probability.

Also, the local resolving process include the standardized and anonymized comparison function, $f_p$, that are able to work on standardized and anonymized data. Further, the local resolving process also integrates the property attribute strength when doing comparison between the matched property values.

The system 100 also includes a global entity resolution subsystem 160 operatively coupled to the local entity resolution subsystem 150. The global entity resolution subsystem 160 is configured to perform a second entity resolution process based on comparison of the one or more property values for the one or more entity references with one or more property values for the one or more entities. In one embodiment, the second entity resolution process may include at least one of a first order statistical approach for uniqueness of the one or more property values of the one or more entity references to the one or more entities, a higher order statistical approach for uniqueness of the one or more property values of the one or more entity references to the one or more entities, a correlation approach in entity reference embeddings to co-reference the one or more entities, a weighted bipartite graph connecting the one or more entity references to the one or more entities, a convolutional neural network for prediction of the one or more entities, a social network analysis or a combination thereof.

The system 100 also includes an entity creation and updating subsystem 170 operatively coupled to the global entity resolution subsystem 160. The entity creation and updating subsystem 170 is configured to modify the corresponding seed set of entity or the one or more entity references for entity resolution based on the property strength score assigned to the at least one additional property in the one or more entity references. The entity creation and updating subsystem 170 is also configured to modify the corresponding seed set of entity or the one or more entity references by creating at least one additional entity, augmenting at least one existing entity by adding at least one additional property and at least one additional property value, adding at least one additional entity reference for entity resolution or a combination thereof. In one embodiment, the one or more entity references and the corresponding one or more seed set of the entities are stored in corresponding storage repositories respectively. In such embodiment, the storage repositories may include, but not limited to a databases or flat files corresponding to the one or more seed set of the entities and the one or more entity references. In such embodiment, the storage repositories may include an entity storage repository 175 and an entity reference storage repository 180 respectively.

Figure 2:
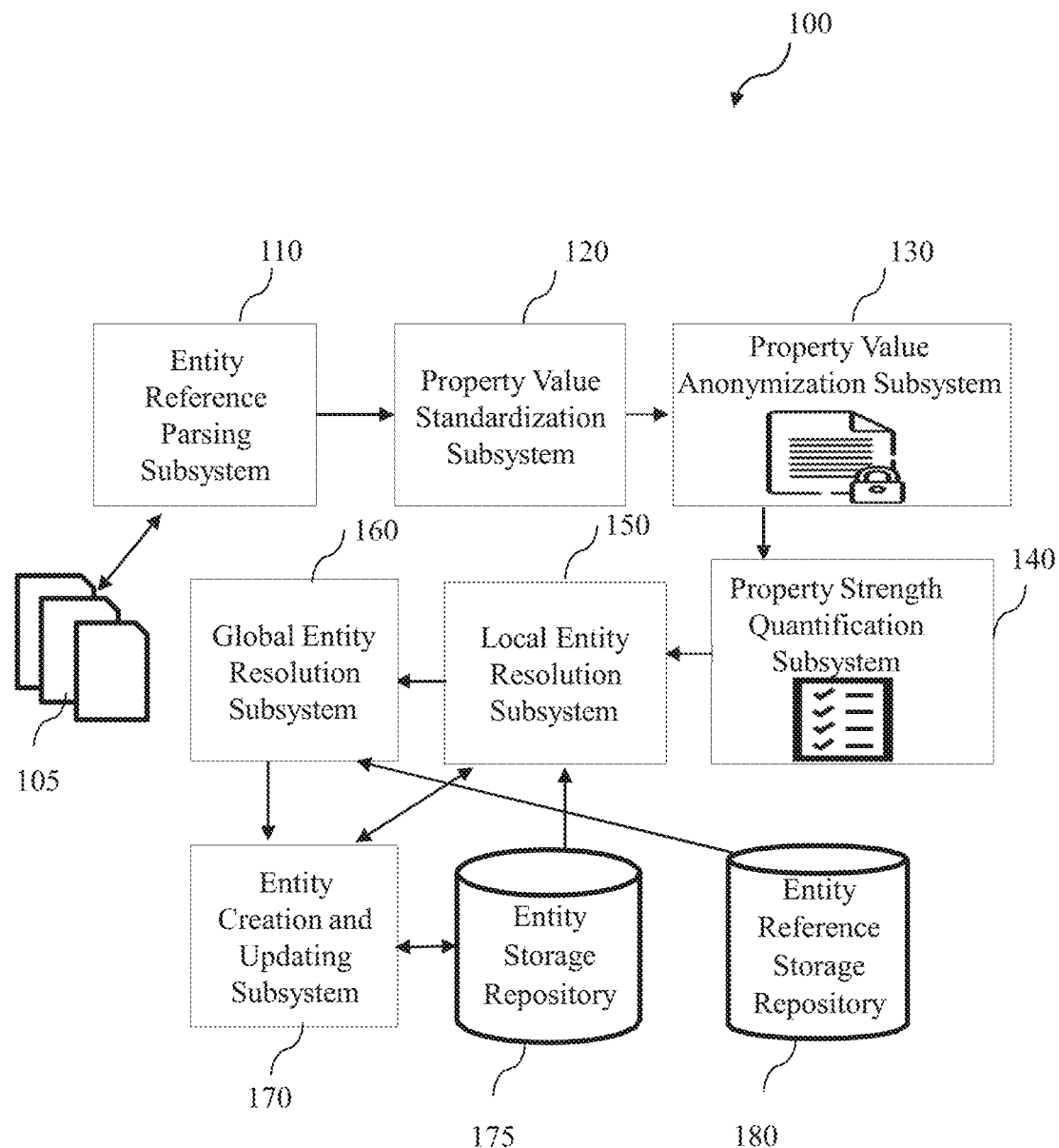
FIG. 2 illustrates a schematic representation of an exemplary embodiment of a system for entity resolution of a data element of FIG. 1 in accordance with an embodiment of the present disclosure.

FIG. 2 illustrates a schematic representation of an exemplary embodiment of a system for entity resolution of a data element of FIG. 1 in accordance with an embodiment of the present disclosure. The system 100 utilizes a base technology such as entity resolution or record linking for association of data elements. The entity resolution-based system is essential to determine if one or more entity references are referencing a same entity. The system 100 is utilized in various sectors such as public sector and federal datasets related to health, transportation, finance, law enforcement, and antiterrorism. Also, the system 100 is utilized for several other application areas such as for web-search, comparison shopping in e-commerce platforms, recommendation system and the like. Considering an example, where the system 100 is utilized for comparison of movie celebrities. In such a scenario, as an example, lets consider that entities are the movie celebrities and the system is pre-populated with a list of the celebrities. For example, the list of celebrities used herein, is extracted from an external source using an application programming interface (API) and used for populating the entities with details of one or more properties and one or more corresponding property values.

An entity reference parsing subsystem 110 ingests and parses one or more entity references of the corresponding entities into corresponding one or more properties and the one or more property values. The entity reference parsing subsystem 110 during parsing observes that the one or more properties in the entity references (ER) may all refer to a single individual, each property may point to a different individual, or each ER may have an arbitrary combination of the one or more properties. For example, the one or more entities with the corresponding one or more properties and the corresponding one or more property values are represented as follows:

Entity 1(E1):
    First name: Leonardo
    Last Name: Dicaprio
    Birth Date: 1937 Jun. 1
    Acting Credits: [Inception, the departed]
Entity 2 (E2):
    First name: Robert
    Last Name: Denim
    Birth Date: 1943 Aug. 17
    Acting Credits: [Raging bull]
    where, first name, last name, birth date, acting credits are the properties for both E1 and E2. Again, the corresponding details of the celebrities such as Leonardo, dicaprio, 1937 Jun. 1, [Inception, the departed] and robert, deniro, 1943 Aug. 17, [raging bull] are the one or more property values for E1 and E2 respectively.

Similarly, the one or more entity references (ER) 105 are represented as follows:
ER 1:
    Name: Robert De Niro
    Birth Date: Aug. 17, 1943
    Acting Credits: Raging Bull, Cape Fear
ER2:
    Name: Morgan Freeman
    Birth Date: Jun. 1, 1937
    Acting Credits: Se7en, Invictus
ER 3:
    Name: Leonardo DiCaprio
    Birth Date: Aug. 17, 1943 (Incorrect birth date, this is actually the birth date for Robert De Niro)
    Acting Credits: Raging Bull, Invictus (Incorrect, Leonardo DiCaprio was not in either of these movies)

Once, the parsing is completed, a property value standardization subsystem 120 determines one or more standardization operations corresponding to a type of data of the one or more property values. The property value standardization subsystem 120 also performs the one or more standardization operations for standardization of the corresponding one or more property values. For example, the one or more standardization operations may include at least one of a letter or number or date formatting operation, local sensitive hashing operation, phonetic standardization operation, bucket standardization operation or a combination thereof. In such embodiment, the letter or number or data formatting operation comprises a standard character operation performed on a string for standardization of the corresponding one or more property values. Upon standardization, the one or more ERs are represented as follows:
ER 1:
    First Name: robert
    Last Name: denim
    Birth Date: 1943 Aug. 17
    Acting Credits: [raging bull, cape fear]
ER 2:
    First Name: morgan
    Last Name: freeman
    Birth Date: 1937 Jun. 1
    Acting Credits: [se7en, invictus]
ER 3:
    First Name: leonardo
    Last Name: dicaprio
    Birth Date: 1943 Aug. 17
    Acting Credits: [raging bull, invictus]

Later, upon standardization, in order to secure sensitive data of the one or more property values, anonymization is essential so that data breach is avoided. A property value anonymization subsystem 130 secures the one or more property values by performing one or more anonymization procedures. For example, the one or more anonymization procedures may include at least one of an encryption technique or a hashing technique. Such one or more anonymization procedures are utilized for anonymization based on case to case requirement and use cases.

Once, the anonymization is done, a property strength quantification subsystem 140 identifies at least one additional property suspected to belong to the seed set of the entity based on an observation of the one or more entity references upon anonymization of the one or more property values. In the example used herein, the one or more property strength quantification models may include one or more statistical models implemented using a maximum likelihood estimation technique and a probabilistic enhancement technique for assignment of the property strength score. For example, if there are 5 ER which resolves to actor 'Morgan Freeman', and out of the 5 ERs suppose one of the property value such as 'height' is not known for the entity 'Morgan Freeman'. Then in such a case, probability of the 'height' is determined as follows:

$P_{height}(6'2''|ER_{Morgan\ Freeman,\ height}) = 3/4 = 0.75$ (because 3 of the 4 ERs have a value for "Height" as 6'2") and $P_{height}(6'0''|ER_{Morgan,\ Freeman,\ height}) = 1/4 = 0.25$.

In this case, a new property is added based on consideration of maximum likelihood estimation and the "height" for the "Morgan Freeman" entity is assigned a value of 6'2". Thus, here, the maximum value for the property is chosen and based on which the at least one property is added.

Further, a local entity resolution subsystem 150 performs a first entity resolution process based on comparison of an entity reference among the one or more entity references with each of an entity respectively from the corresponding entities at a predetermined time interval. For example, the first entity resolution process includes at least one of a pre-defined heuristic example between the entity and the entity reference, an evidence accumulation between the entity and the entity reference using a one-degree comparison function or a n-degree comparison function, a standardized and anonymized comparison function, a property strength integration or a combination thereof.

Again, beyond the local resolution process, a global resolution process performed by a global entity resolution subsystem 160 is also essential. In this process, a single ER is compared with a single entity in an explicit context of all observed entities and the ERs. The global entity resolution subsystem utilizes several approaches for performing the global resolution process which may include at least one of a first order statistical approach for uniqueness of the one or more property values of the one or more entity references to the one or more entities, a higher order statistical approach for uniqueness of the one or more property values of the one or more entity references to the one or more entities, a correlation approach in entity reference embeddings to co-reference the one or more entities, a weighted bipartite graph connecting the one or more entity references to the one or more entities, a convolutional neural network for prediction of the one or more entities, a social network analysis or a combination thereof.

Further, once the entity resolution is completed via the local and the global resolution process, an entity creation and updating subsystem 170 modifies the corresponding one or more entities or the one or more entity references based on the property strength score assigned to the at least one additional property in the one or more entity references. The entity creation and updating subsystem 170 modifies the corresponding one or more entities or the one or more entity references by creating at least one additional entity, augmenting at least one existing entity by adding at least one additional property and at least one additional property value, adding at least one additional entity reference for entity resolution or a combination thereof. In the example used herein, the one or more entity references and the corresponding one or more entities are stored in corresponding storage repositories. Separate storage of the one or more corresponding entities and the one or more corresponding ERs in the entity storage repository 175 and the entity reference storage repository 180 respectively makes the overall process of the entity resolution clear and enables the system 100 to add new ERs to the appropriate storage repositories with information resolving the reference to a known entity, to create new entities as necessary and expand the properties of existing entities as necessary. Thus, helps in secure storage and association of the entities with the more entity references.

Figure 3:
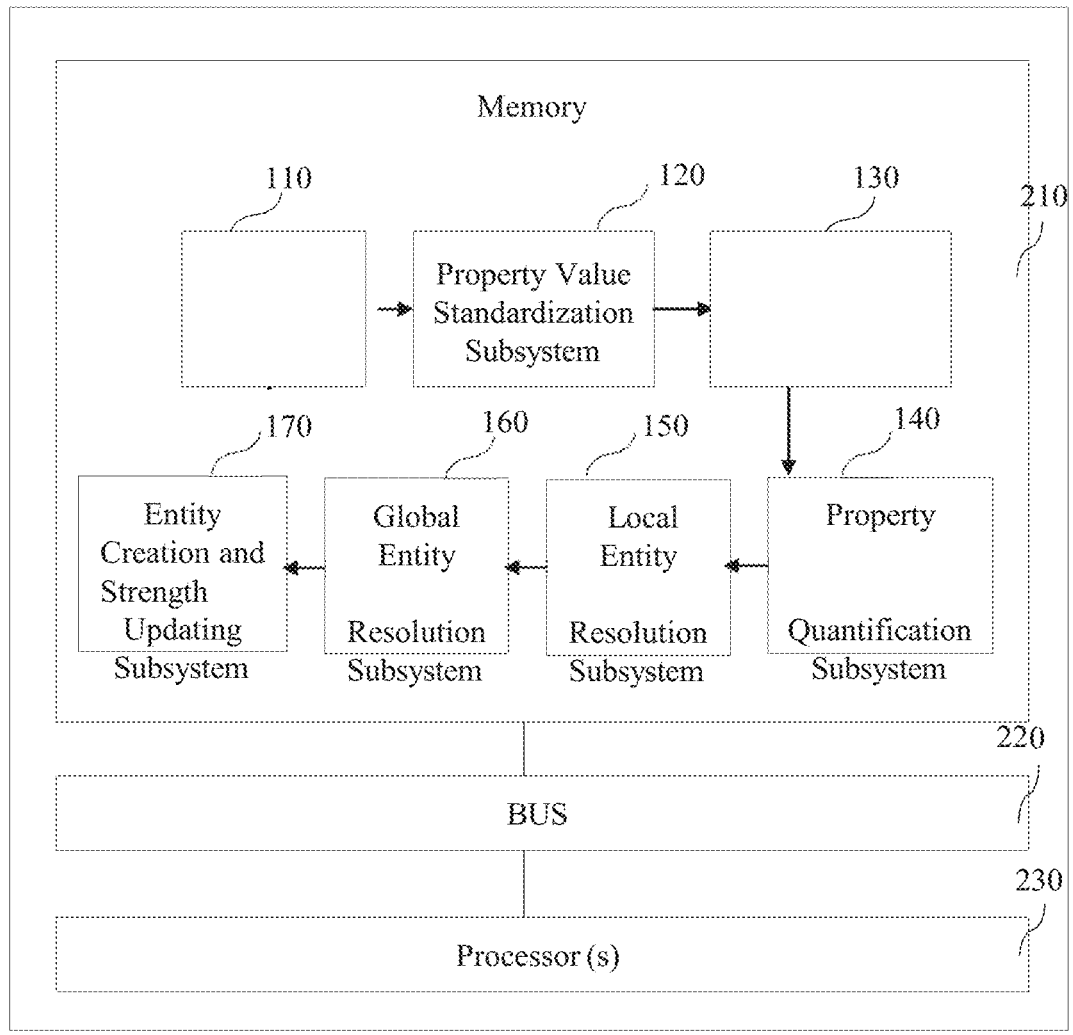
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 is substantially similar to a system 100 of FIG. 1. The memory 210 has following subsystem: an entity reference parsing subsystem 110, a property value standardization subsystem 120, a property value anonymization subsystem 130, a property strength quantification subsystem 140, a local entity resolution subsystem 150, a global entity resolution subsystem 160, and an entity creation and updating subsystem 170.

The entity reference parsing subsystem 110 is configured to parse one or more entity references of a corresponding seed set of entity of the data element into corresponding one or more personal data properties and one or more property values. The property value standardization subsystem 120 is configured to determine one or more standardization operations corresponding to a type of data of the one or more property values based on the one or more entity references parsed. The property value standardization subsystem 120 is also configured to perform the one or more standardization operations determined for standardization of the corresponding one or more property values. The property value anonymization subsystem 130 is configured to secure the one or more property values by performing one or more anonymization procedures based on the one or more standardization operations performed. The property strength quantification subsystem 140 is configured to identify at least one additional property suspected to belong to the seed set of the entity based on an observation of the one or more entity references upon anonymization of the one or more property values. The property strength quantification subsystem 140 is also configured to assign a property strength score to the at least one additional property identified by utilizing one or more property strength quantification models based on observation of the one or more property values for the one or more entity references. The property strength quantification subsystem 140 is also configured to add the at least one additional property to the corresponding seed set of entity based on the property strength score assigned to the at least one additional property. The local entity resolution subsystem 150 is configured to perform a first entity resolution process based on comparison of an entity reference among the one or more entity references with each of an entity respectively from the corresponding seed set of the entity at a predetermined time interval. The global entity resolution subsystem 160 is configured to perform a second entity resolution process based on comparison of the one or more property values for the one or more entity references with one or more property values for the one or more entities. The entity creation and updating subsystem 170 is configured to modify the corresponding seed set of entity or the one or more entity references for entity resolution based on the property strength score assigned to the at least one additional property in the one or more entity references.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 4A:
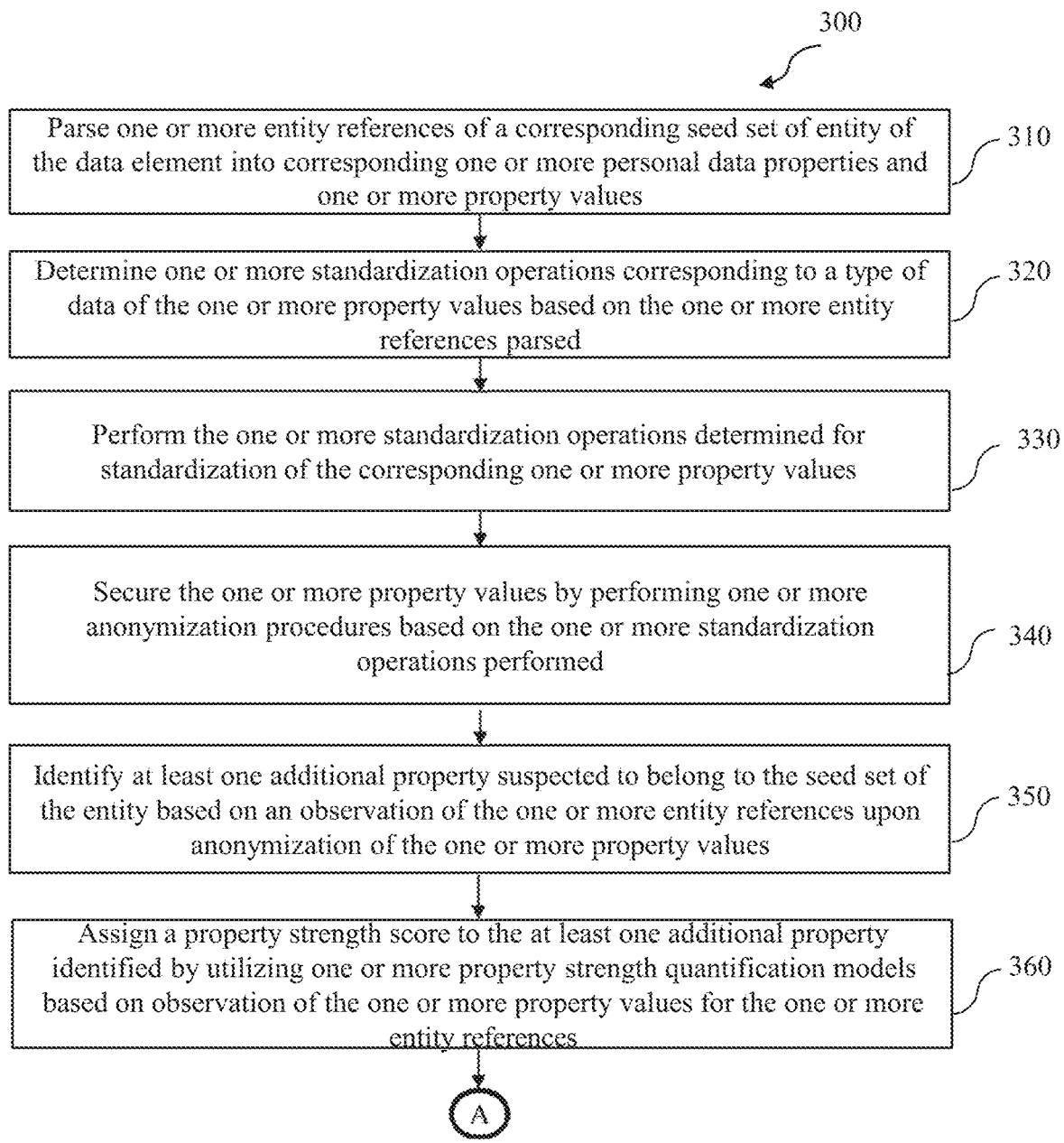
FIG. 4(a) is a flow chart representing the steps involved in a method for entity resolution of a data element and FIG. 4(b) represents the continued steps of the method of FIG. 4(a) in accordance with the embodiment of the present disclosure.
Figure 4B:
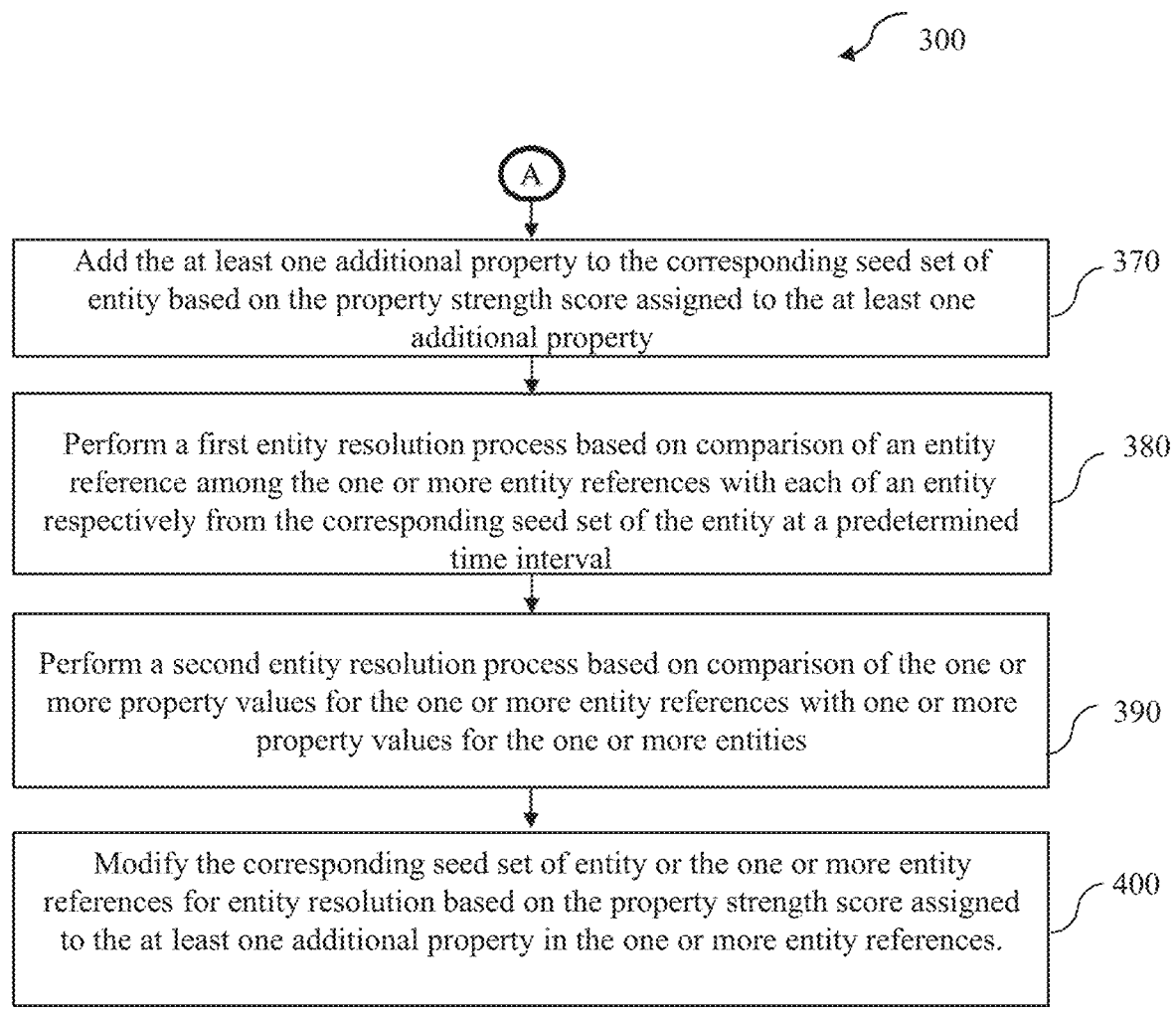

FIG. 4 is a flow chart representing the steps involved in a method 300 for entity resolution of a data element in accordance with the embodiment of the present disclosure. The method 300 includes parsing, by an entity reference parsing subsystem, one or more entity references of a corresponding seed set of entity of the data element into corresponding one or more personal data properties and one or more property values in step 310. In one embodiment, parsing the one or more entity references of the corresponding seed set of entity of the data element may include parsing at least one of a size zero entity, a pre-populated set of one or more entities, a subset of one or more properties for an entity or a combination thereof into corresponding one or more personal data properties and one or more property values. In one embodiment, the entity may include one or more properties with one or more corresponding property values. In such embodiment, the entity may include, but not limited to an individual, an organization, an object and the like. In some embodiment, the one or more entity references may include at least one of a text source, a database, an audio source, an image source or a combination thereof.

The method 300 also includes determining, by a property value standardization subsystem, one or more standardization operations corresponding to a type of data of the one or more property values based on the one or more entity references parsed in step 320. In one embodiment, determining the one or more standardization operations corresponding to the type of data of the one or more property values may include determining the type of data of the one or more property values may include, a numeric data, a character data, and the like.

The method 300 also includes performing, by the property value standardization subsystem, the one or more standardization operations determined for standardization of the corresponding one or more property values in step 330. In one embodiment, performing the one or more standardization operations determined for standardization of the corresponding one or more property values may include performing at least one of a letter or number or date formatting operation, local sensitive hashing operation, phonetic standardization operation, bucket standardization operation or a combination thereof. In such embodiment, the letter or number or data formatting operation comprises a standard character operation performed on a string for standardization of the corresponding one or more property values. In another embodiment, the local sensitive hashing operation is performed for identification of sensitivity and similarity between one or more similar input words of the one or more property values by using a hash function and a similarity calculation technique. In yet another embodiment, the phonetic standardization operation is performed to determine one or more input words of the one or more property values having a resemblance in sound using one or more phonetic determination techniques. In such embodiment, the one or more phonetic determination technique may include, but not limited to, a Soundex technique, a Metaphone technique and the like. In one embodiment, the bucket standardization operation includes creating one or more categorical buckets of a predefined size based on identification of a minimum range and a maximum range of the one or more property values. The bucket standardization technique also includes placing the one or more property values for standardization into the one or more categorical buckets created.

The method 300 also includes securing, by a property value anonymization subsystem, the one or more property values by performing one or more anonymization procedures based on the one or more standardization operations performed in step 340. In one embodiment, securing the one or more property values by performing the one or more anonymization procedures may include performing at least one of an encryption technique or a hashing technique for securing the one or more property values.

The method 300 also includes identifying, by a property strength quantification subsystem, at least one additional property suspected to belong to the seed set of the entity based on an observation of the one or more entity references upon anonymization of the one or more property values in step 350. The method 300 also includes assigning, by the property strength quantification subsystem, a property strength score to the at least one additional property identified by utilizing one or more property strength quantification models based on observation of the one or more property values for the one or more entity references in step 360. In one embodiment, assigning the property strength score to the at least one additional property identified may include assigning the property strength score by utilizing one or more statistical models implemented using a maximum likelihood estimation technique and a probabilistic enhancement technique for assignment of the property strength score. The method 300 also includes adding, by the property strength quantification subsystem, the at least one additional properly to the corresponding seed set of entity based on the property strength score assigned to the at least one additional property in step 370.

The method 300 also includes performing, by a local entity resolution subsystem, a first entity resolution process based on comparison of an entity reference among the one or more entity references with each of an entity respectively from the corresponding seed set of the entity at a predetermined time interval in step 380. In one embodiment, performing, the first entity resolution process based on the comparison of the entity reference among the one or more entity references with each of the entity respectively from the corresponding seed set of the entity may include performing the first resolution process which may include at least one of a pre-defined heuristic example between the entity and the entity reference, an evidence accumulation between the entity and the entity reference using a one-degree comparison function or a n-degree comparison function, a standardized and anonymised comparison function, a property strength integration or a combination thereof.

The method 300 also includes performing, by a global entity resolution subsystem, a second entity resolution process based on comparison of the one or more property values for the one or more entity references with one or more property values for the one or more entities in step 390. In one embodiment, performing the second entity resolution process based on the comparison of the one or more property values may include performing the second entity resolution process may include at least one of a first order statistical approach for uniqueness of the one or more property values of the one or more entity references to the one or more entities, a higher order statistical approach for uniqueness of the one or more property values of the one or more entity references to the one or more entities, a correlation approach in entity reference embeddings to co-reference the one or more entities, a weighted bipartite graph connecting the one or more entity references to the one or more entities, a convolutional neural network for prediction of the one or more entities, a social network analysis or a combination thereof.

The method 300 also includes modifying, by an entity creation and updating subsystem, the corresponding seed set of entity or the one or more entity references for entity resolution based on the property strength score assigned to the at least one additional property in the one or more entity references in step 400. In one embodiment, modifying the corresponding seed set of the entity or the one or more entity references for the entity resolution may include creating at least one additional entity, augmenting at least one existing entity by adding al least one additional property and at least one additional property value, adding at least one additional entity reference for entity resolution or a combination thereof. In one embodiment, the one or more entity references and the corresponding one or more seed set of the entities are stored in corresponding storage repositories respectively. In such embodiment, the storage repositories may include, but not limited to a databases corresponding to the one or more seed set of the entities and the one or more entity references.

Various embodiments of the present disclosure provide a system which operate in a secure manner where, even in the event of a data breach, no personal data related to an entity is leaked.

Moreover, the present disclosed system automatically constructs entities even in case of unavailability of well-defined source of truth or relevant personal data attributes defined. Thus, the system is extensively used and built to handle any new attribute properties.

Furthermore, the present disclosed system is applicable on inhomogeneous data sources where entity references includes an arbitrary number of PD attributes and also capable of performing entity resolution when a significant number of the attributes in an entity reference belong to different entities, i.e., when the entity references are very noisy or contaminated.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computer implemented system for entity resolution of a data element comprising:
   a hardware processor; and
   a memory coupled to the hardware processor, wherein the memory comprises a set of program instructions in the form of a processing subsystem, configured to be executed by the hardware processor, wherein the processing subsystem is hosted on a server and configured to execute on a network to control bidirectional communications among a plurality of subsystems comprising:
   an entity reference parsing subsystem configured to parse one or more entity references of a corresponding seed set of an entity of the data element into corresponding one or more personal data properties and one or more property values;
   a property value standardization subsystem operatively coupled to the entity reference parsing subsystem, wherein the property value standardization subsystem is configured to:
     determine one or more standardization operations corresponding to a type of data of the one or more property values based on the one or more entity references parsed; and
     perform the one or more standardization operations determined for standardization of the corresponding one or more property values;
   a property value anonymization subsystem operatively coupled to the property value standardization subsystem, wherein the property value anonymization subsystem is configured to secure the one or more property values by performing one or more anonymization procedures based on the one or more standardization operations performed;
   a property strength quantification subsystem operatively coupled to the property value anonymization subsystem, wherein the property strength quantification subsystem is configured to:
     identify at least one additional property suspected to belong to the seed set of the entity based on an observation of the one or more entity references upon anonymization of the one or more property values;

assign a property strength score to the at least one additional property identified by utilizing one or more property strength quantification models based on observation of the one or more property values for the one or more entity references, wherein the one or more property strength quantification models comprises one or more statistical models implemented using a maximum likelihood estimation technique comprising a binary classification process and a probabilistic enhancement technique for assignment of the property strength score based on calculation of probability of a corresponding property value by using a sigmoid function; and add the at least one additional property to the corresponding seed set of the entity based on the property strength score assigned to the at least one additional property;

a local entity resolution subsystem operatively coupled to the property standardization subsystem, wherein the local entity resolution subsystem is configured to perform a first entity resolution process based on comparison of an entity reference among the one or more entity references with each of the entity respectively from the corresponding seed set of the entity at a predetermined time interval, wherein the first entity resolution process comprises at least one of a pre-defined heuristic example between the entity and the entity reference, an evidence accumulation between the entity and the entity reference using a one-degree Comparison function or a n-degree Comparison function, a standardized and anonymized comparison function, a property strength integration or a combination thereof, wherein the evidence accumulation calculates a probability between the entity and the entity reference by considering that the entity reference belongs to the entity by using convolution of a one-degree Comparison function or a n-degree Comparison function of individual properties, wherein probability calculation comprises a property-specific function and a function to combine a set of individual comparison probabilities, wherein the property specific function is configured to determine how likely the entity reference is to resolve a specific entity considering that the property is in isolation and the function comprises a Pearson method or a fisher method for combining P-values of the Bayes approach to combining probabilities;

a global entity resolution subsystem operatively coupled to the local entity resolution subsystem, wherein the global entity resolution subsystem is configured to perform a second entity resolution process based on comparison of the one or more property values for the one or more entity references with one or more property values for the one or more entities; and an entity creation and updating subsystem operatively coupled to the global entity resolution subsystem, wherein the entity creation and updating subsystem is configured to modify the corresponding seed set of the entity or the one or more entity references for entity resolution based on the property strength score assigned to the at least one additional property in the one or more entity references.

2. The system of claim 1, wherein the seed set the entity comprises at least one of a size zero entity, a pre-populated set of one or more entities, a subset of one or more properties for the entity or a combination thereof.

3. The system of claim 1, wherein the one or more entity references comprises at least one of a text source, a database, an audio source, an image source or a combination thereof.

4. The system of claim 3, wherein the entity comprises one or more properties with one or more corresponding property values.

5. The system of claim 1, wherein the one or more standardization operations comprises at least one of a letter or number or date formatting operation, local sensitive hashing operation, phonetic standardization operation, bucket standardization operation or a combination thereof.

6. The system of claim 5, wherein the letter or number or data formatting operation comprises a standard character operation performed on a string for standardization of the corresponding one or more property values.

7. The system of claim 5, wherein the local sensitive hashing operation is performed for identification of sensitivity and similarity between one or more similar input words of the one or more property values by using a hash function and a similarity calculation technique.

8. The system of claim 5, wherein the phonetic standardization operation is performed to determine one or more input words of the one or more property values having a resemblance in sound using one or more phonetic determination techniques.

9. The system of claim 5, wherein the bucket standardization operation comprises:
    creating one or more categorical buckets of a predefined size based on identification of a minimum range and a maximum range of the one or more property values;
    placing the one or more property values for standardization into the one or more categorical buckets created.

10. The system of claim 1, wherein the one or more anonymization procedures comprises at least one of an encryption technique or a hashing technique for securing the one or more property values.

11. The system of claim 1, wherein the maximum likelihood estimation technique comprises addition of at least one additional property to the entity based on estimation of a most likely property value upon calculation of probability of a corresponding property value.

12. The system of claim 1, wherein the second entity resolution process comprises at least one of a first order statistical approach for uniqueness of the one or more property values of the one or more entity references to the one or more entities, a higher order statistical approach for uniqueness of the one or more property values of the one or more entity references to the one or more entities, a correlation approach in entity reference embeddings to co-reference the one or more entities, a weighted bipartite graph connecting the one or more entity references to the one or more entities, a convolutional neural network for prediction of the one or more entities, a social network analysis or a combination thereof.

13. The system of claim 1, wherein the entity creation and updating subsystem is configured to modify the corresponding seed set of the entity or the one or more entity references by creating at least one additional entity, augmenting at least one existing entity by adding at least one additional property and at least one additional property value, adding at least one additional entity reference for entity resolution or a combination thereof.

14. The system of claim 1, wherein the one or more entity references and corresponding one or more seed set of the entities are stored in corresponding storage repositories respectively.

15. A computer-implemented method comprising:
parsing, by an entity reference parsing subsystem, one or more entity references of a corresponding seed set of an entity of the data element into corresponding one or more personal data properties and one or more property values;
determining, by a property value standardization subsystem, one or more standardization operations corresponding to a type of data of the one or more property values based on the one or more entity references parsed;
performing, by the property value standardization subsystem, the one or more standardization operations determined for standardization of the corresponding one or more property values;
securing, by a property value anonymization subsystem, the one or more property values by performing one or more anonymization procedures based on the one or more standardization operations performed;
identifying, by a property strength quantification subsystem, at least one additional property suspected to belong to the seed set of the entity based on an observation of the one or more entity references upon anonymization of the one or more property values;
assigning, by the property strength quantification subsystem, a property strength score to the at least one additional property identified by utilizing one or more property strength quantification models based on observation of the one or more property values for the one or more entity references, wherein the one or more property strength quantification models comprises one or more statistical models implemented using a maximum likelihood estimation technique comprising a binary classification process and a probabilistic enhancement technique for assignment of the property strength score based on calculation of probability of a corresponding property value by using a sigmoid function;
adding, by the property strength quantification subsystem, the at least one additional property to the corresponding seed set of the entity based on the property strength score assigned to the at least one additional property;
performing, by a local entity resolution subsystem, a first entity resolution process based on comparison of an entity reference among the one or more entity references with each of the entity respectively from the corresponding seed set of the entity at a predetermined time interval, wherein the first entity resolution process comprises at least one of a pre-defined heuristic example between the entity and the entity reference, an evidence accumulation between the entity and the entity reference using a one-degree Comparison function or a n-degree Comparison function, a standardized and anonymized comparison function, a property strength integration or a combination thereof,
wherein the evidence accumulation calculates a probability between the entity and the entity reference by considering that the entity reference belongs to the entity by using convolution of a one-degree Comparison function or a n-degree Comparison function of individual properties, wherein probability calculation comprises a property-specific function and a function to combine a set of individual comparison probabilities,
wherein the property specific function is configured to determine how likely the entity reference is to resolve a specific entity considering that the property is in isolation and the function comprises a Pearson method or a fisher method for combining P-values of the Bayes approach to combining probabilities;
performing, by a global resolution subsystem, a second entity resolution process based on comparison of the one or more property values for the one or more entity references with one or more property values for the one or more entities; and
modifying, by an entity creation and updating subsystem, the corresponding seed set of the entity or the one or more entity references for entity resolution based on the property strength score assigned to the at least one additional property in the one or more entity references.

16. A non-transitory computer-readable medium storing a computer program that, when executed by a processor, causes the processor to perform a method to dynamically inject multiple checkout capabilities, wherein the method comprises:
parsing, by an entity reference parsing subsystem, one or more entity references of a corresponding seed set of an entity of the data element into corresponding one or more personal data properties and one or more property values;
determining, by a property value standardization subsystem, one or more standardization operations corresponding to a type of data of the one or more property values based on the one or more entity references parsed;
performing, by the property value standardization subsystem, the one or more standardization operations determined for standardization of the corresponding one or more property values;
securing, by a property value anonymization subsystem, the one or more property values by performing one or more anonymization procedures based on the one or more standardization operations performed;
identifying, by a property strength quantification subsystem, at least one additional property suspected to belong to the seed set of the entity based on an observation of the one or more entity references upon anonymization of the one or more property values;
assigning, by the property strength quantification subsystem, a property strength score to the at least one additional property identified by utilizing one or more property strength quantification models based on observation of the one or more property values for the one or more entity references, wherein the one or more property strength quantification models comprises one or more statistical models implemented using a maximum likelihood estimation technique comprising a binary classification process and a probabilistic enhancement technique for assignment of the property strength score based on calculation of probability of a corresponding property value by using a sigmoid function;
adding, by the property strength quantification subsystem, the at least one additional property to the corresponding seed set of entity based on the property strength score assigned to the at least one additional property;
performing, by a local entity resolution subsystem, a first entity resolution process based on comparison of an entity reference among the one or more entity references with each of the entity respectively from the corresponding seed set of the entity at a predetermined time interval, wherein the first entity resolution process comprises at least one of a pre-defined heuristic example between the entity and the entity reference, an evidence accumulation between the entity and the entity reference using a one-degree Comparison function or a n-degree Comparison function, a standardized and anonymized comparison function, a property strength integration or a combination thereof, wherein the evidence accumulation calculates a probability between the entity and the entity reference by considering that the entity reference belongs to the entity by using convolution of a one-degree Comparison function or a n-degree comparison function of individual properties, wherein probability calculation comprises a property-specific function and a function to combine a set of individual comparison probabilities, wherein the property specific function is configured to determine how likely the entity reference is to resolve a specific entity considering that the property is in isolation and the function comprises a Pearson method or a fisher method for combining P-values of the Bayes approach to combining probabilities;

performing, by a global resolution subsystem, a second entity resolution process based on comparison of the one or more property values for the one or more entity references with one or more property values for the one or more entities; and modifying, by an entity creation and updating subsystem, the corresponding seed set of the entity or the one or more entity references for entity resolution based on the property strength score assigned to the at least one additional property in the one or more entity references.

\* \* \* \* \*